May 22, 1934.  M. SCHNAIER  1,959,550
HOSE CLAMP
Filed May 4, 1932
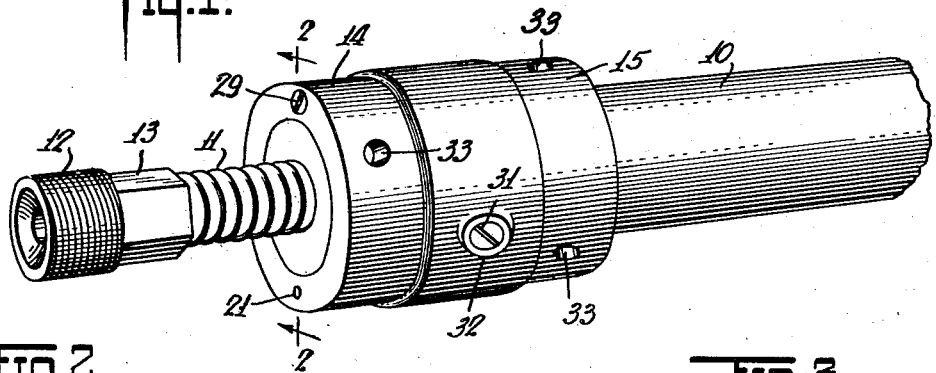
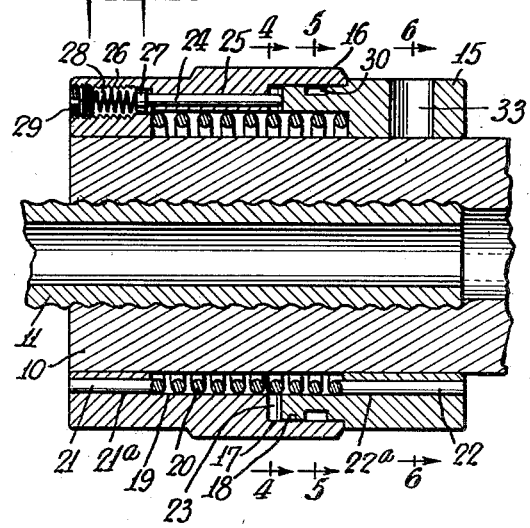
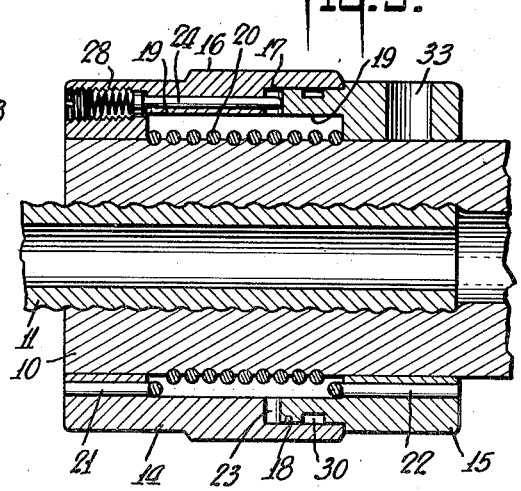
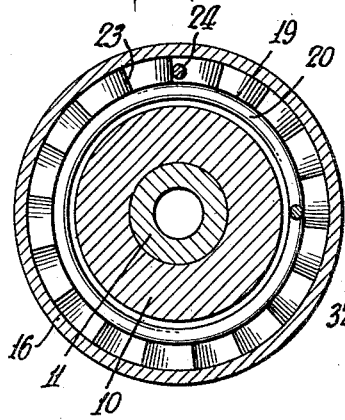
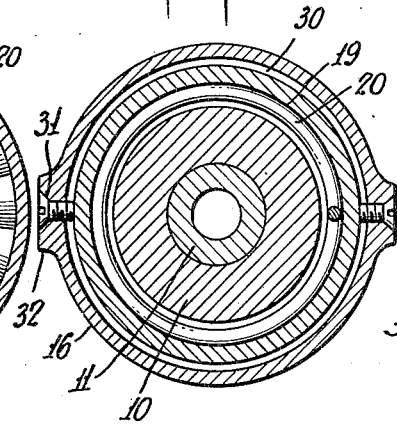
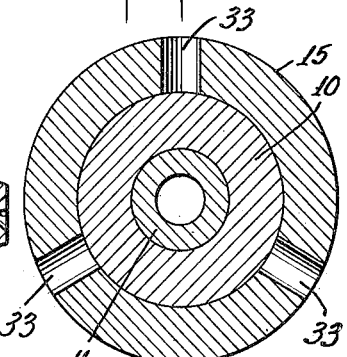
INVENTOR
*Milton Schnaier*
BY
*Dean, Fairbank, Hirsch & Foster*
ATTORNEYS Patented May 22, 1934

1,959,550

UNITED STATES PATENT OFFICE 1,959,550

HOSE CLAMP

Milton Schnaier, New York, N. Y.

Application May 4, 1932, Serial No. 609,085

2 Claims. (Cl. 285—84)

My present invention is concerned with a conduit clamping or coupling device which is especially adapted for use in connection with high pressure, heavy duty hose.

An object of the invention is to provide a fitting of this character capable of so clamping a nozzle in a hose that leakage will be prevented even when the pressures run in the order of two thousand pounds or more per square inch and a fitting which may be conveniently and quickly applied to a hose without use of cement and simply by the use of a conventional wrench.

Another object is to provide a clamp in which the circumferentially contractile clamping element exerts a uniform powerful grip on the material to be clamped, yet the power necessary for tightening the clamping element is but slight.

Other objects are to provide a clamp which is of comparatively light weight and compact size considering the duties which it performs, and which is devoid of external projections, a clamp which may be removed and replaced without injury to the hose and a clamp of simple, practical, rugged, durable construction and well suited to meet the requirements of economical manufacture and convenient application to or removal from the hose.

In accordance with a preferred embodiment of the invention the circumferentially contractile clamping element comprises a coiled spring adapted to encircle the member to be clamped. This spring is preferably housed and concealed within the two part body of the clamp, the body parts being rotatable relatively to each other and anchored to the respective spring ends. Upon relative rotation of the body parts they wind the spring and cause circumferential contraction of all of the convolutions thereof forcing them into powerful gripping engagement with the hose. As this spring is twisted the pressure is applied over a substantial length of the hose, this length being dependent upon the length of the spring itself which is preferably restricted against endwise extension and with its contiguous coils spaced slightly apart in order to compensate for the extra convolutions, convolution or portion thereof formed as an incident of the twisting.

A simple type of ratchet mechanism is preferably employed to block any tendency of the spring to uncoil and effect inadvertent relative retrograde rotation of the body sections of the clamp.

Preferably all of the constituent elements of the clamp may be quickly and conveniently assembled with respect to each other. The spring is under no tension when the coupling is slipped over the hose and after the spring has been tightened up and is locked by the ratchet, uncoupling may be effected by releasing the ratchet mechanism and slipping the clamp off the end of the hose. The spring, the ratchet and other parts of the mechanism which are subject to any substantial deterioration from moisture are completely housed and protected within the rotatable body portions of the coupling. A feature of the invention is the fact that a relatively light dog carried by one of these rotatable elements and coacting with ratchet teeth on the other is effective to prevent unwinding of the spring. The energy stored in the spring and tending to uncoil it is relatively slight as compared to the powerful grip of the spring on the member to be clamped so that shearing stresses on the dog are but slight.

The invention may be more fully understood from the following description in connection with the accompanying drawing wherein:—

Fig. 1 is a perspective view showing the end of the hose with the hose nozzle clamped in place by my improved fitting, Fig. 2 is an enlarged longitudinal sectional view through the clamp, hose and nozzle taken approximately on the line 2—2 of Fig. 1 and showing the position of the parts after the clamp has been slipped over the hose end before it has been tightened.

Fig. 3 is a view similar to Fig. 2 but illustrating the position of the parts after the clamp has been tightened, and Figs. 4, 5 and 6 are transverse sectional views taken respectively on the lines 4—4, 5—5 and 6—6 of Fig. 2.

In the drawing I have used the reference numeral 10 to designate a hose which is typically of the heavy duty type adapted to withstand high internal pressures and which is consequently relatively incompressible itself especially at the portion thereof which encircles the shouldered or ribbed end 11 of a nozzle 12. The shouldered end of the nozzle is forced into the end of the hose in the usual manner and the nozzle is preferably provided with a wrench receiving portion 13 of polygonal cross sectional shape for convenience in extracting it after the hose clamp has been removed.

The clamp includes a pair of relatively rotatable sleeve members 14 and 15 the former of which is externally enlarged at one end as indicated at 16 and the mouth of this sleeve is internally enlarged or recessed as at 17 to telescopically receive the reduced end 18 of the sleeve 15.

The non-telescoping ends of the sleeves are each of an internal diameter sufficient to conveniently slip over the standard size hose 10 with which the clamp is to be used and each sleeve is provided with an internal annular recess 19, these recesses cooperatively defining an annular chamber in which the coiled contractile spring 20 is normally accommodated.

This spring may be made of various stock including tape or ribbon stock but as herein illustrated it is formed of heavy piano wire and has its aligned ends 21 and 22 extended in a direction parallel to the axis of the coil and accommodated in longitudinal bores 21a and 22a which extend from the ends to the respective sleeves 14 and 15 into the end walls of the spring receiving chamber 19, 19. Thus without the use of any special mechanism the spring ends are firmly anchored with respect to the sleeve elements.

The reduced end of the sleeve 15 has its end face toothed, affording a plurality of ratchet teeth 23 coacting with a dog 24 carried by the sleeve 14. This dog slides in a longitudinal bore 25 in the sleeve 14 which extends from the bottom of the recess 17 out through the end of the sleeve, the outer end of this bore being enlarged and screw threaded as at 26. The dog consists simply of a pin having a head 27 lying in the enlarged portion 26 of the bore 25, the dog being urged against the ratchet teeth by a coiled spring 28 in bore portion 26 which reacts against a screw 29 screwed into the outer end of this bore.

In order to prevent relative endwise separation of the two telescopically connected sleeves 14 and 15, the reduced portion 18 of the latter sleeve is provided with an annular groove 30 therein and screws 31 pass through diametrically opposite portions of the sleeve enlargement 16 with their inner ends entering the grooves. Preferably the portion 16 is provided with bosses 32 of sufficient thickness to permit the heads of the screws 31 to be counter-sunk and lie flush with the outer surface of the bosses. There are no protruding screw heads or other parts on the clamp since screws 32 and 29 both lie flush with the surface of the sleeve 14 and there are no projections afforded by the wrench receiving radial openings 33 which are formed near the remote ends of the sleeves.

In assembling the clamp the dog 24 is placed in the sleeve 14 and secured by its spring and screw. The end 21 of the spring 20 is inserted into its bore 21a. The bore 22a of the sleeve 15 is aligned with the other projecting end 22 of the spring so that this spring enters the sleeve as the latter is pushed inwardly into telescoping relation with the sleeve 14 to an extent where the ratchet teeth 23 are stopped by the bottom of the recess 17 in the opposite sleeve. Screws 31 are then applied in order to lock the sleeves against relative endwise displacement while permitting relative rotation thereof.

At this time the spring is under no tension and with the parts in the positon illustrated in Fig. 2 the sleeve is slipped over the end of the hose into which the nozzle has previously been inserted. The diameter of heavy duty hose of this character is substantially uniform so that substantially no clearance need be afforded in order to conveniently slip the clamp into place before tightening.

The wrenches are now applied to the openings 33 in the two sleeves and the sleeves are twisted in a direction to wind the spring 20. The dog or pawl 24 is effective to lock the two sleeves against relative retrograde rotation under the influence of the spring as the latter is tensioned or twisted. The twisting movement takes effect over the entire length of the spring to contract all of the convolutions thereof as a new convolution is formed. This winding, or tensioning of the spring would, it is understood, take immediate effect as an endwise extension of the spring except for the fact that the spring is confined against endwise expansion by the end walls of the annular recess in which it is accommodated. There is sufficient space between adjacent convolutions of the spring to permit this twisting or tightening action. The convolutions will be closer together as tightening occurs as indicated in Fig. 3. The effect of the tightening is to circumferentially contract all of the spring convolutions and cause them to forcefully bite into the hose, this clamping action taking effect over a large cylindrical area determined by the length of the spring itself, it being understood that the spring convolutions will be as close together as is practicable in order to avoid the effect of a series of localized pressure arising and to obtain the effect of a relatively long cylindrical element having a powerful bite.

In practice the actual amount of twisting necessary to effectively tighten the spring may be less than a revolution of one sleeve, the relative diameter of the spring having been slightly exaggerated in Figs. 2 and 3 in order to illustrate the clamping effect.

After the spring has been tightened to the greatest extent possible the shearing stress on the dog 24 will still be relatively slight since the gripping action is controlled not by the amount of energy stored in the spring but solely by the extent of contraction thereof.

In order to disassemble this coupling and apply it to a new hose end it is merely necessary to remove the screw 29 and withdraw the dog and its spring whereupon the spring will rotate the two coupling sections to their original position and will have expanded sufficiently to permit the coupling to be conveniently slipped off.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A hose clamp including a pair of sleeve members having their ends telescopically interfitted and cooperatively defining an internal annular elongated recess, a coiled spring lying in said recess and having its ends anchored to the respective sleeves and coacting groove and pin means to prevent endwise displacement of the sleeves while permitting rotation thereof.

2. A hose clamp including a pair of sleeves, one of said sleeves having an enlarged recessed mouth and the other sleeve having a reduced end fitting within the mouth, means to block endwise separation while permitting relative rotation thereof, said sleeves cooperatively defining an internal annular recess, a coiled spring accommodated in said recess and having its ends anchored to the respective sleeves, said reduced sleeve end having a groove therein and screws passed through the other sleeve and entering said groove to afford the means for preventing endwise displacement of the sleeves.

MILTON SCHNAIER.